United States Patent [19]

Sasaki et al.

[11] Patent Number: 5,329,211
[45] Date of Patent: Jul. 12, 1994

[54] CRT DISPLAY UNIT

[75] Inventors: Kazuyoshi Sasaki, Hitachi; Kikuo Tomita, Hitachiohta, both of Japan

[73] Assignee: Hitachi, Ltd., Tokyo, Japan

[21] Appl. No.: 18,382

[22] Filed: Feb. 17, 1993

[30] Foreign Application Priority Data

Feb. 17, 1992 [JP] Japan .................. 4-029544

[51] Int. Cl.$^5$ .............................. H01J 29/56
[52] U.S. Cl. .................... 315/371; 315/399
[58] Field of Search ................ 315/371, 399

[56] References Cited

U.S. PATENT DOCUMENTS 5,179,320 1/1993 Tripod .................. 315/399

Primary Examiner—Theodore M. Blum
Attorney, Agent, or Firm—Antonelli, Terry, Stout & Kraus

[57] ABSTRACT

A comparator detects a set-up voltage superimposed on a video signal. The detected set-up voltage is input to a timing information detection circuit to detect the display start timings and display end timings of a video signal or a single line and a single picture, respectively. Then, the detected timing information is input to an arithmetic operation means to determine the display period of the video signal for the single line and single picture and further determine the ratios thereof with respect to predetermined reference values. Further, the amounts of dislocation of the timing relationship between the display periods for the single line and single screen and a horizontal synchronizing signal and vertical synchronizing signal from predetermined reference relative relationships are determined, respectively. A picture display area adjustment means corrects the amplitudes of a horizontal deflection current and vertical deflection current corresponding to each other in accordance with the ratios determined by the arithmetic operation means, respectively and the level or phase of the horizontal deflection current and the level of the vertical deflection current corresponding to each other in accordance with the dislocations of the relative timing relationships of the determined display periods, respectively. As a result, even if an input video signal has a different timing specification, the size and position of a picture display area can be automatically adjusted to predetermined references.

6 Claims, 11 Drawing Sheets

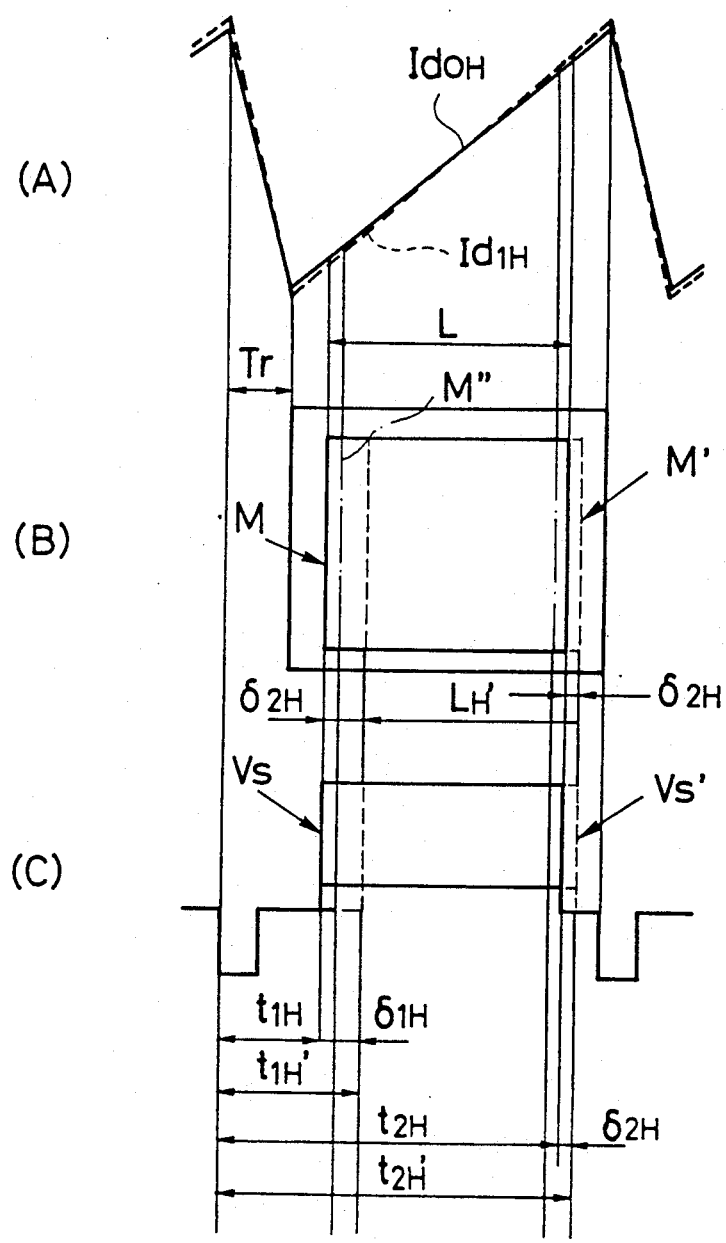

CRT DISPLAY UNIT

BACKGROUND OF THE INVENTION

1. Field of the Invention

The present invention relates to a CRT display unit. More specifically, the present invention relates to a CRT display unit having a function for automatically adjusting the position and vertical/horizontal sizes of a picture display area to a predetermined position and size in accordance with a plurality of different kinds of video signals with a different timing specification such as an input start timing, input end timing and the like, using the horizontal or vertical synchronization signal of a video signal for a single line or single picture as a reference point.

2. Description of the Related Art

The position and size in the vertical/horizontal directions of a picture display area displayed on the tube surface of a CRT display unit are determined based on a timing specification such as the cycle of the vertical/horizontal synchronization signals contained in a video signal input to the CRT display unit, input start timing, input end timing of the video signal to the synchronization signals, and the like.

More specifically, the size and position of a raster scanning area as an area in which an electron beam is scanned in accordance with the cycle of the horizontal/vertical synchronization signals are determined. A picture display area in which an effective picture is displayed is set to an area smaller than the raster display area and the horizontal size (horizontal width) of the picture display area is determined by a time width from the input start timing to input end timing of a video signal $V_L$ for a single line. The input start timing of the video signal $V_L$ corresponds to the position where the display of a picture for a single line is started. The input end timing of the video signal $V_L$ corresponds to the position where the display of the picture for the single line is ended. Therefore, the time width from the input start timing to the input end timing of the video signal $V_L$ corresponds to the display period $Td_H$ of the picture for the single line. Further, the horizontal position of the picture display area to the raster scanning area is determined by the relative positional relationship on a time axis of the display period $Td_H$ for a single line to the cycle $T_{1H}$ of the horizontal display signal.

On the other hand, the vertical size (vertical width) of the picture display area is determined by the time width (display period $Td_V$) from the input start timing (display start position) to the input end timing (display end position) of a video signal $V_S$ for a single picture. The vertical position of the picture display area to the raster scanning area is determined by the relative positional relationship on a time axis between the vertical synchronization signal and the display period $Td_V$ for a single picture.

Usually, the deflection circuit and the like of a CRT display unit are designed in accordance with the predetermined reference timing specification of a video signal so that the horizontal/vertical positions and size of a picture display area has a predetermined position and size.

Incidentally, CRT display units used in recent computer systems are required to display a plurality of pictures each having a different dissolution (for example, 640 dots×480 lines, 1280 dots×1024 lines, etc.) by changing them. This requirement results from the fact that personal computers having a higher processing speed are made at a lower cost and thus systems with a high resolution can be obtained at a low cost and further application software in use covering various fields, from business to engineering, has an improved function and wide variety.

Further, work stations, CAD systems and the like increasingly require realization of so-called multi-scanning type CRT display units by which the size and position of a picture display area can be automatically adjusted in accordance with a timing specification of various video signals to support various available systems.

To satisfy these requirements, there is conventionally proposed a CRT display unit wherein raster scanning start/end positions are detected from the horizontal/vertical synchronization signals of an input video signal and the number of horizontal dots are determined by an arithmetic operation from preset display parameters such as the aspect ratio of a picture display area, display period ratio and the like to automatically adjust a display size (Japanese Patent Unexamined Publication No. Sho 62-91992).

Nevertheless, since the aforesaid conventional CRT display unit pays attention to the raster scanning start/end positions, a problem arises in that the size and position of the picture display area cannot be automatically adjusted unless a display period to a scanning period is preset in an arithmetic operation block.

SUMMARY OF THE INVENTION

Taking the above into consideration, an object of the present invention is to provide a CRT display unit capable of automatically adjusting the size and position of a picture display area in accordance with the timing specification of an input video signal.

Recently, in almost all CRT display systems, a video signal input thereto includes a set-up voltage for indicating the black level of a display picture. The present invention is arranged such that the size and position of an image display area is automatically adjusted to a video signal having an arbitrary timing specification, by paying attention to the fact that the display period, display start position and display end position for a single line or single picture can be confirmed at all times by detecting the set-up voltage.

A CRT display unit according to the present invention, which has a cathode ray tube including an electron gun for irradiating an electron beam to a tube surface in accordance with an input video signal, a horizontal deflection coil and vertical deflection coil provided with the cathode ray tube, a horizontal deflection circuit for horizontally scanning the electron beam by flowing a sawtooth deflection current to the horizontal deflection coil in synchronism with the horizontal synchronizing signal contained in the video signal; and a vertical deflection circuit for vertically scanning the electron beam by flowing a sawtooth deflection current to the vertical deflection coil in synchronism with the vertical synchronizing signal contained in the video signal, is characterized by comprising:

a comparator for detecting the rising-up and falling-down of a set-up voltage superimposed upon the video signal;

an arithmetic operation means for detecting the first display period of a picture corresponding to a horizontal scanning line and the second display period of the picture corresponding to a single screen based on a signal output from the comparator as well as detecting the relative positional relationship on a time axis between the detected first display period and the horizontal synchronizing signal and the relative positional relationship on a time axis between the detected second display period and the vertical synchronizing signal; and a picture adjustment means for correcting the amplitudes of the horizontal deflection current and the vertical deflection current corresponding to each other so that the detected first and second display periods coincide with a predetermined reference display period, and for correcting the level and one of the phases of the horizontal deflection current so that the relative positional relationship on a time axis between the detected first display period and the horizontal synchronizing signal coincides with a predetermined reference relative positional relationship and the level of the vertical deflection current so that the relative positional relationship on a time axis between the detected second display period and the vertical synchronizing signal coincides with a predetermined reference relative positional relationship.

More specifically, the horizontal size and vertical size of the picture display area are determined by the amplitude of a deflection current flowing to a horizontal deflection coil or vertical deflection coil. Note, when the sawtooth deflection current has a given inclination, the amplitude is proportional to the length of a display period Td ($Td_H$, $Td_V$). Therefore, the horizontal size and vertical size of the picture display area can be adjusted to desired ones in such a manner that the reference display period of a reference picture display area M is compared with the display period of an input video signal and the amplitude of the deflection current is increasingly or decreasingly corrected in accordance with the ratio thereof. Further, the horizontal display position and vertical display position of the picture display area are determined by the level (bias amount) of the horizontal or vertical deflection current. Note, the vertical display position of the picture display area can also be adjusted by dislocating the phase (time axis) of the video signal with respect to the phase of the horizontal deflection current. Therefore, the horizontal display position and vertical display position of the picture display area can be adjusted to desired ones in such a manner that an amount of dislocation of the relative positional relationship on a time axis of the display period Td' of an input video signal with respect to a horizontal or vertical synchronizing signal from a reference value is determined and the level of the horizontal or vertical deflection current is corrected in accordance with the amount of dislocation.

A case in which the vertical size and position of the picture display area is adjusted will be described in specific detail. First, it is assumed that $\delta_1 V(=t_1 V'-t_1 V)$ represents a difference between the upper end (display start position $t_1 V$) of the reference picture display area set at an initial adjustment and the upper end (display start position $t_1 V'$) of the picture display area obtained by displaying an arbitrarily input video signal as it is. Further, it is assumed that $\delta_2 V(=t_2 V'-t_2 V)$ represents a difference between the lower end (display end position $t_2 V$) of the reference picture display area and the lower end (display end position $t_2 V'$) of the picture display area obtained by displaying the arbitrarily input video signal as it is. In this case, the position is corrected by shifting the center of the picture display area in the upward or downward direction on the screen of a CRT by $(\delta_1 V+\delta_2 V)/2$ and the size is corrected by multiplying the picture size obtained when it is displayed as it is by $(t_2 V-t_1 V)/(t_2 V'-t_1 V')$. With this arrangement, even if a video signal with an arbitrary timing specification is input, the picture display area thereof can be automatically adjusted to the same size and position as those of the reference picture display area set at the initial adjustment.

More specifically, although a video signal has a level changing in accordance with a content to be displayed, a set-up voltage is not changed. Therefore, as shown in FIG. 2, in a video signal $V_S$ for a single picture to which a set-up voltage $V_{SU}$ is added, a reference voltage level Va for detecting the set-up voltage $V_{SU}$ can be set between a "0" level $V_O$ as the reference level of the video signal $V_S$ and the set-up voltage $V_{SU}$. As a result, the display period $Td_V$ for a single picture, display start position $t_1 V$ and display end position $t_2 V$ can be detected regardless of the content of the video signal with a changing level and thus the relationship of the picture display area M of the CRT to a raster scanning area P can be found.

From the above relationship, the picture display area M having a desired size L and position shown by a solid line in FIG. 3 is obtained by using the reference timing specification shown by a solid line in FIG. 3 [vertical synchronizing signal $V_{SYNC}$, display period for a single picture $(t_2 V-t_1 V)$, display start position $t_1 V$, display end position $t_2 V$, display cycle $T_1 V$] when an initial adjustment is executed.

Next, when a video signal $V_S'$ as shown by a dotted line in FIG. 3, which has the same frequency as that of the reference timing specification but has a different timing specification for a display period, display start position and display end position (vertical synchronizing signal $V_{SYNC}$, display period $(t_2 V'-t_1 V')$, display start position $t_1 V'$, display end position $t_2 V'$ and display cycle $T_1 V'$), is input to the CRT display unit, the picture display area M' is arranged as shown by a dotted line with a display size L reduced as compared with the reference M and a display position shifted downwardly of the center of the screen.

When it is assumed that the reference timing specification has a display start position $t_1 V$ and display end position $t_2 V$, and a timing specification different from the reference timing specification has a display start position $t_1 V'$ and display end position $t_2 V'$, it suffices to correct the amplitude of a vertical deflection current and multiply the size of a raster scanning area P by $(t_2 V-t_1 V)/(t_2 V'-t_1 V')$ to obtain the same display size L as that of the reference timing specification. Further, with respect to the display position, the picture display area M can be shifted to the center of the screen by shifting the raster scanning area itself by correcting the level of the vertical deflection current. Note, in FIGS. 2 and 3, a reference character $Id_V$ designates a vertical deflection current applied to the vertical deflection coil of the CRT.

Further, the horizontal size and position of the picture display area M' can be also automatically adjusted to the size and position of the reference picture display area M set at the initial adjustment by the correction executed in the same manner. Note, in the adjustment of the horizontal position and size of the picture display area, the picture display area M' can be also shifted by the correction for advancing the time axis of the video signal $V_S$ with respect to the synchronizing signal $H_{SYNC}$.

BRIEF DESCRIPTION OF THE DRAWINGS

FIG. 11 is a diagram explaining an example of the changing states of a video signal, horizontal deflection current, and display screen for explaining the correction of the horizontal size and position of a picture display area when a video signal with a timing specification different from a reference timing specification is input.

DETAILED DESCRIPTION OF THE PREFERRED EMBODIMENT

Figure 1:
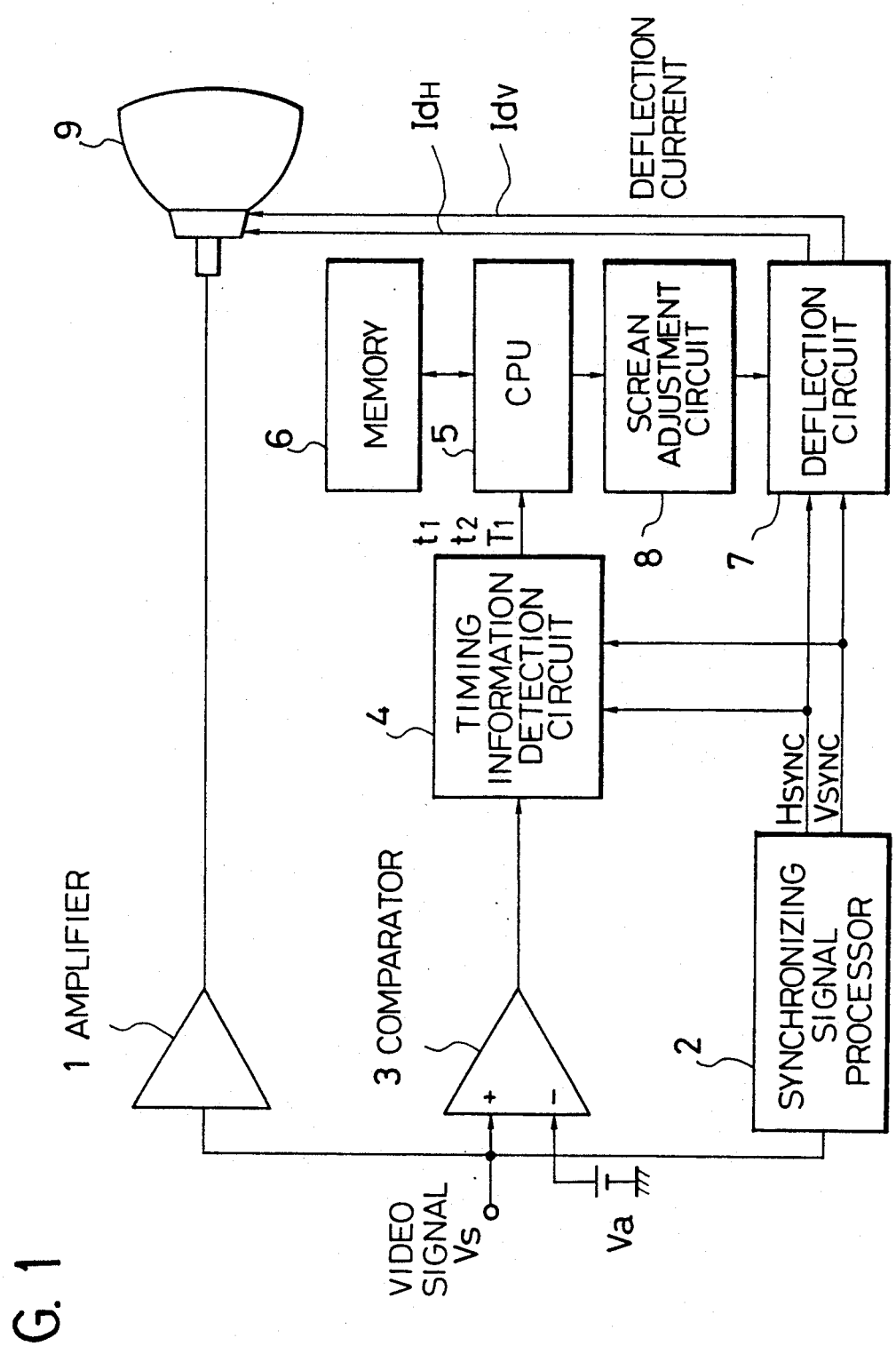
FIG. 1 is a block diagram showing the arrangement of an embodiment of a CRT display unit according to the present invention.
Figure 2:
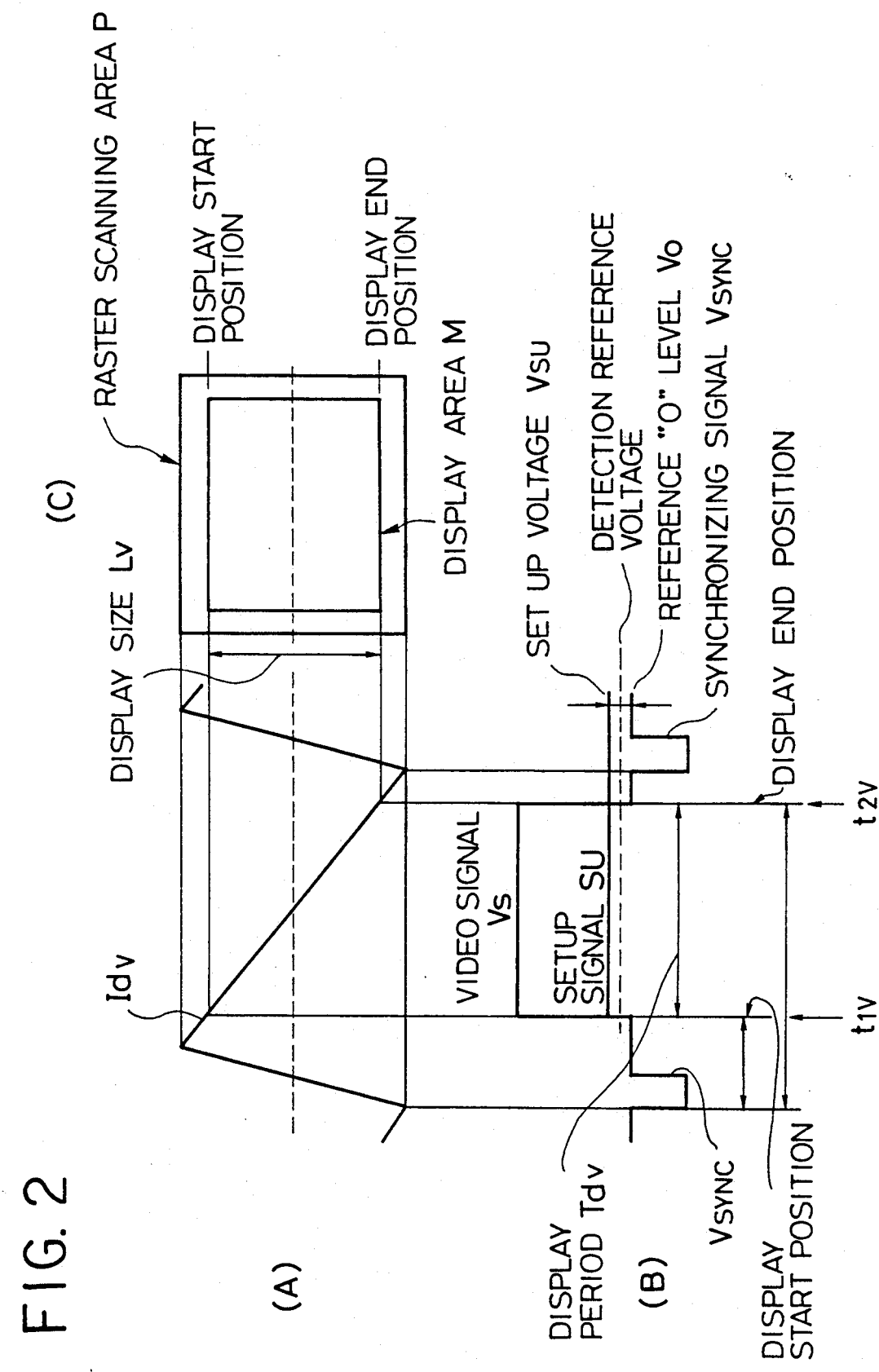
FIG. 2 is a diagram explaining the relationship between a video input signal and a display screen in the CRT display unit according to the present invention.

An embodiment of the present invention will be described below with reference to the drawings. FIG. 1 shows the entire arrangement of an embodiment of a CRT display unit according to the present invention. In FIG. 1, the CRT display unit according to the present invention is composed of a video amplifier 1, synchronizing signal processor 2, comparator 3, timing information detection circuit 4, CPU 5, memory 6, deflection circuit 7, screen adjustment circuit 8, and CRT 9.

A video signal $V_s$ is input to the video amplifier 1, synchronizing signal processor 2 and comparator 3.

The video amplifier 1 amplifies the video signal to a sufficient signal level and causes the CRT 9 to display a picture by driving the cathode thereof.

The comparator 3, which detects a set-up voltage $V_{SU}$ showing the black level of the picture contained in the video signal $V_S$, compares the video signal $V_S$ input thereto with a detection reference voltage Va and outputs a high level signal while $V_S \geq V_a$. The reference voltage Va is set to a level between the reference "0" level $V_O$ of the video signal $V_S$ and the set-up voltage $V_{SU}$. Therefore, an output from the comparator 3 goes to a high level for the period corresponding the display period $Td_H$ of a video signal $V_L$ for a single line corresponding to a horizontal scanning line.

The synchronizing signal processor 2 fetches the input video signal $V_S$, separates the horizontal synchronizing signal $H_{SYNC}$ and vertical synchronizing signal $V_{SYNC}$ each contained in the video signal $V_S$ and outputs them to the timing information detection circuit 4 and deflection circuit 7.

The CPU 5 fetches data showing a display period $(t_{2H}' - t_{1H}')$, display start position $t_{1H}'$, display end position $t_{2H}'$, and display cycle $T_{1H}'$ for a single line of the picture on the tube surface of the CRT 9 output from the timing information detection circuit 4, controls the picture adjustment circuit 8 by reading a display start position $t_{1H}$, display end position $t_{2H}$ and display cycle $T_{1H}$ at an initial adjustment prestored in the memory 6, changes a horizontal deflection current flowing in the deflection coil of the CRT 9 through the deflection circuit 7, and thus adjusts the horizontal display size $L_H$ and display position of a picture display area M. Further, the CPU 5 fetches data showing a display period $(t_{2V}' - t_{1V}')$, display start position $t_{1V}'$, display end position $T_{2H}'$, and display cycle $T_{1V}'$ for a single picture of the picture on the tube surface of the CRT 9, controls the screen adjustment circuit 8 by reading a display start position $t_{1V}$, display end position $T_{2V}$ and display cycle $T_{1V}$ at the initial adjustment prestored in the memory 6, changes a vertical deflection current flowing in the deflection coil of the CRT 9 through the deflection circuit 7, and thus adjusts the vertical display size $L_V$ and display position of the picture display area M.

Next, the specific arrangement of the main portion of the CRT display unit shown in FIG. 1 will be described.

Figure 4:
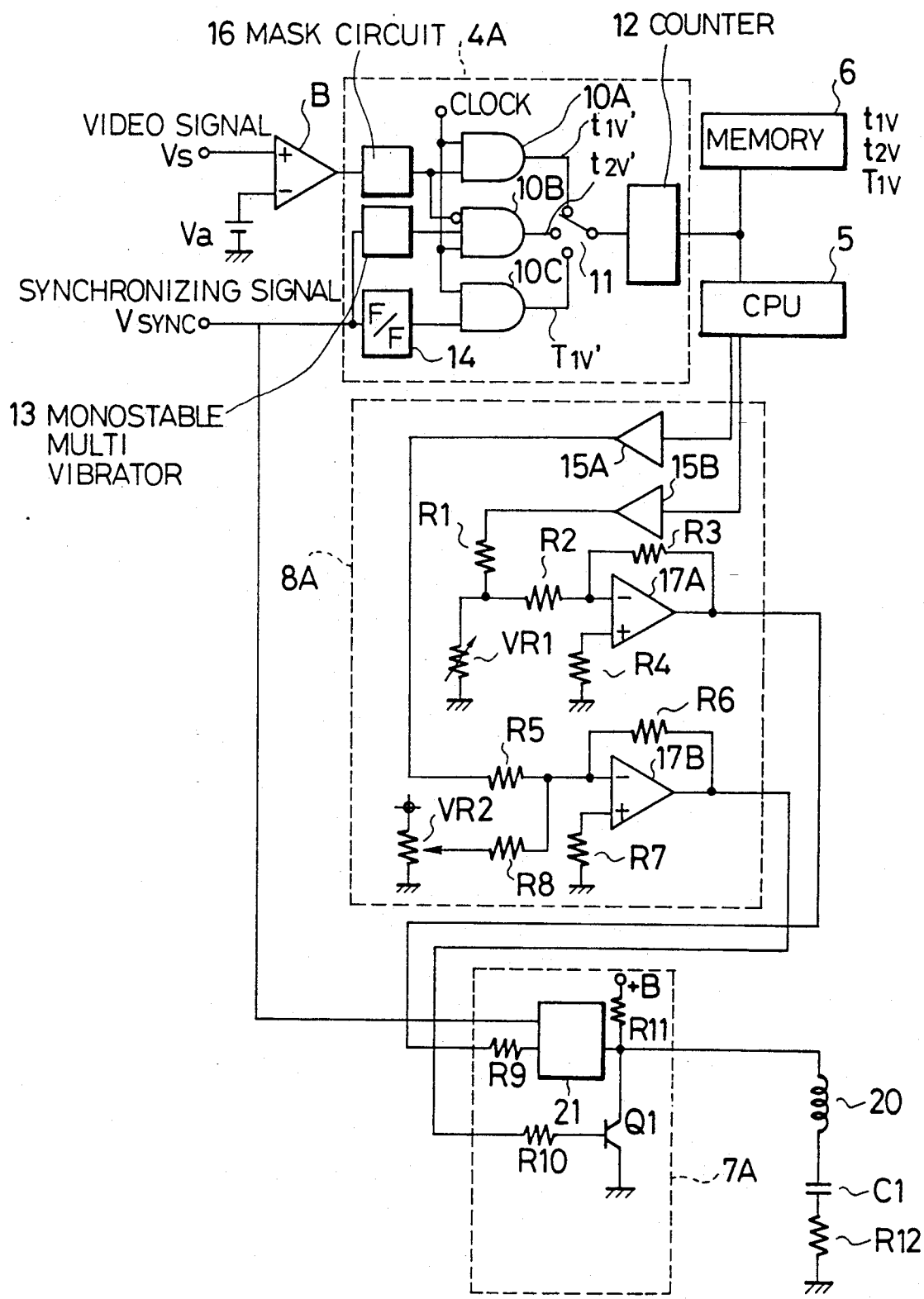
FIG. 4 is a circuit diagram showing the specific arrangement of a main portion relating to the adjustment of the vertical size and position of the picture display area of the CRT display unit shown in FIG. 1.
Figure 5:
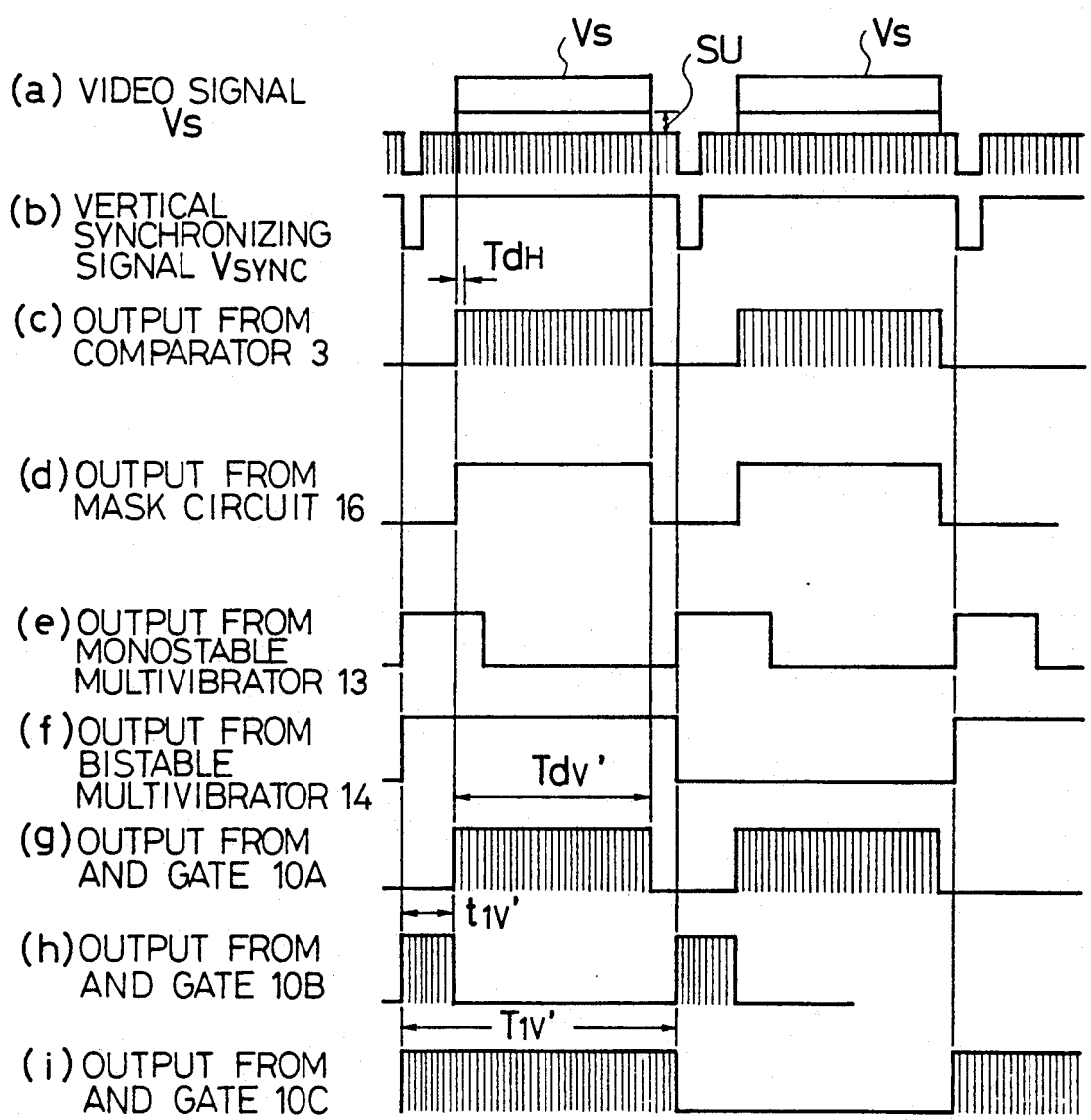
FIG. 5 is a timing chart showing the operating state of the main portion of the CRT display unit shown in FIG. 4.

FIG. 4 shows the arrangement of a main portion for the adjustment of the vertical size $L_V$ and display position of the picture display area M. In FIG. 4, a timing information detection circuit 4A is composed of a mask circuit 16 input with a timing signal showing the display period $Td_H$ detected by the comparator 3, AND gates 10A-10C, multiplexers for selectively changing signals output from the AND gates 10A-10C [FIGS. 5(g)-(i)], counter 12 for counting clock output from the multiplexer 11, and monostable multivibrator and bistable multivibrator triggered in response to the vertical synchronizing signal $V_{SYNC}$ separated by the synchronizing signal processor 2.

Further, a picture adjustment circuit 8A is composed of D/A converters 15A, 15B, operational amplifiers 17A, 17B, picture display size adjustment trimmer VR1, picture display position adjustment trimmer VR2, and resistors R1-R8.

In the above arrangement, output from the comparator 3 is a signal which goes to a high level in synchronism with the display period $Td_H$ of the video signal $V_L$ for a single line horizontally scanned from the video signal $V_S$ [FIG. 5(c)]. The mask circuit 16 of the timing information detection circuit 4A masks the horizontal synchronizing signal $H_{SYNC}$ (low level component) contained in a pulse train signal output from the comparator 3 and outputs a signal which goes to a high level in synchronism with the display period $Td_V$ of the video signal $V_S$ for a single picture [FIG. 5(d)]. As described above, the mask circuit 16 detects the display period $Td_V$ of the video signal $V_S$ for the single picture by removing only the horizontal synchronizing signal $H_{SYNC}$ having a pulse width narrower than that of the display period $Td_H$ and can be realized by, for example, an RC integration circuit composed of a resistor and capacitor. A signal output from the mask circuit 16 is input to the AND gates 10A, 10B as a gate signal.

Further, the monostable multivibrator 13 is triggered by the vertical synchronizing signal $V_{SYNC}$ output from the synchronizing signal processor 2 [FIG. 5(b)] and outputs a pulse with a given width to the AND gate 10B as an input signal [FIG. 5(e)]. This pulse width is set to cover the maximum variable value of a timing specification from the time at which the vertical synchronizing signal $V_{SYNC}$ is input to the display start position $t_1v'$ where the video signal $V_L$ for a first line is input. The bistable multivibrator 14 is operated in response to the vertical synchronizing signal $V_{SYNC}$ [FIG. 5(b)] and outputs a signal which is repeatedly inverted in synchronism with the vertical synchronizing signal $V_{SYNC}$ to the AND gate 10C as a gate signal [FIG. 5(f)].

The AND gates 10A-10C are input with clock pulses and the AND gate 10A supplies clock pulses fetched within the display period $Td_V$ to the counter 12 through the multiplexer 11 [FIG. 5(g)]. Here, the horizontal synchronizing signal $H_{SYNC}$ is preferably used as the clock pulses by which the detection value of a timing specification corresponds to the number of horizontal scanning lines. The counter 12 counts the number of input clock pulses and outputs the same as a detection value of the display period $Td_V$ [$=(t_2v'-t_1v')$]. The AND gate 10B supplies clock pulses while a timing signal showing the display period $Td_V$ is at a low level, i.e., clock pulses before the display period $Td_V$ is started to the counter 12 through the multiplexer 11 [FIG. 5(h)]. The counter 12 counts the number of input clock pulses and outputs the same as a detection value of the display start position $t_1v'$. The AND gate 10C supplies clock pulses fetched within the cycle of the vertical synchronizing signal $V_{SYNC}$ to the counter 12 through the multiplexer 12 every cycle [FIG. 5(i)]. The counter 12 counts the number of input clock pulses and outputs the detected value of the display cycle $T_1v'$ every cycle.

Respective data detected by the timing information detection circuit 4A are compared by the CPU 5 with the display start position $t_1v$, display end position $t_2v$ and cycle $T_1v$ of a reference timing specification used at an initial picture adjustment and prestored in the memory 6.

Figure 6:
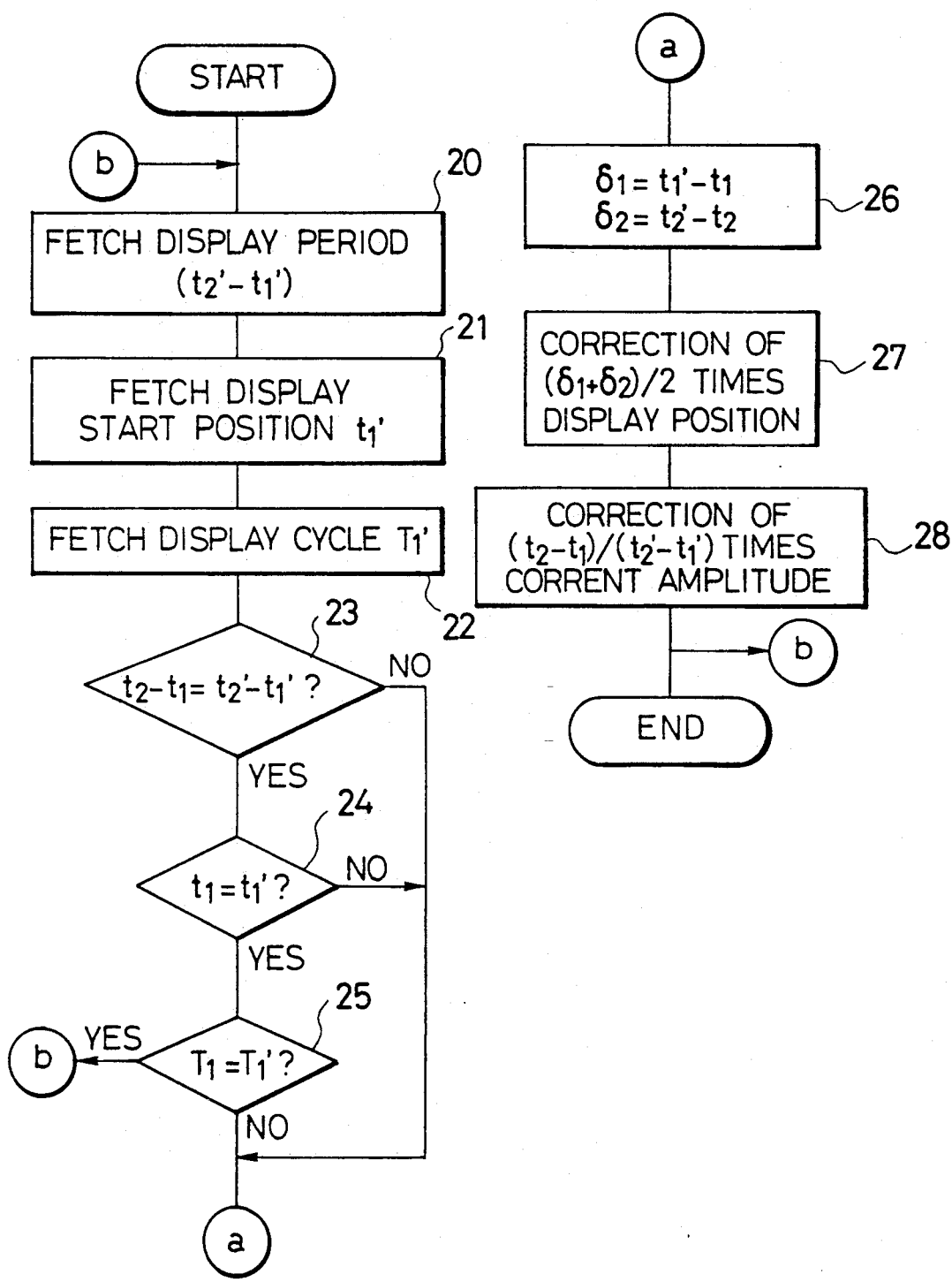
FIG. 6 is a flowchart showing the processing content of the CPU in FIGS. 1 and 4.

The processing executed by the CPU 5 for the adjustment of a vertical size and display position of the picture display area will be described with reference to FIGS. 6 to 8. Note, since the processing executed by the CPU 5 for the adjustment of the size and display position in a vertical direction subscript is the same as that executed for a horizontal direction, suffixes $H$ and $V$ for discriminating the vertical direction and horizontal direction are omitted in FIG. 5.

First, when the CRT display unit is energized and a program is started, the display period $Td_V'$ ($=t_2v'-t_1v'$), display start position $t_1v'$, and display cycle $T_1v'$ of a picture are read from the timing information start circuit 4A (steps 20, 21, 22).

Next, it is determined whether $(t_2v-t_1v)=(t_2v'-t_1v')$, that is, the display period of the reference picture display area M at the initial picture adjustment is equal to the display period of the picture created by a video signal being presently input. When it is determined that the former is equal to the latter, it is determined whether the display start position $t_1v$ of the reference picture display area M at the initial picture adjustment is equal to the display start position $t_1v'$ of the picture created by the video signal being presently input (steps 23, 24).

Further, when it is determined that the display period $t_1v$ is equal to the display period $t_1v'$, it is determined whether the display cycle $T_1v$ of the reference picture display area M at the initial picture adjustment is equal to the display cycle $T_1v'$ of the picture created by the video signal being presently input (step 25). When it is determined that the former is equal to the latter at step 25, the process returns to step 20.

On the other hand, when it is determined in steps 23, 24 and 25 that the display period, display start position and display period of the reference picture display area M at the initial picture adjustment are not equal to those of the picture created by the video signal being presently input, the size and position of the picture display area are corrected as described below (steps 26, 27 and 28) and the process returns to step 20.

Figure 3:
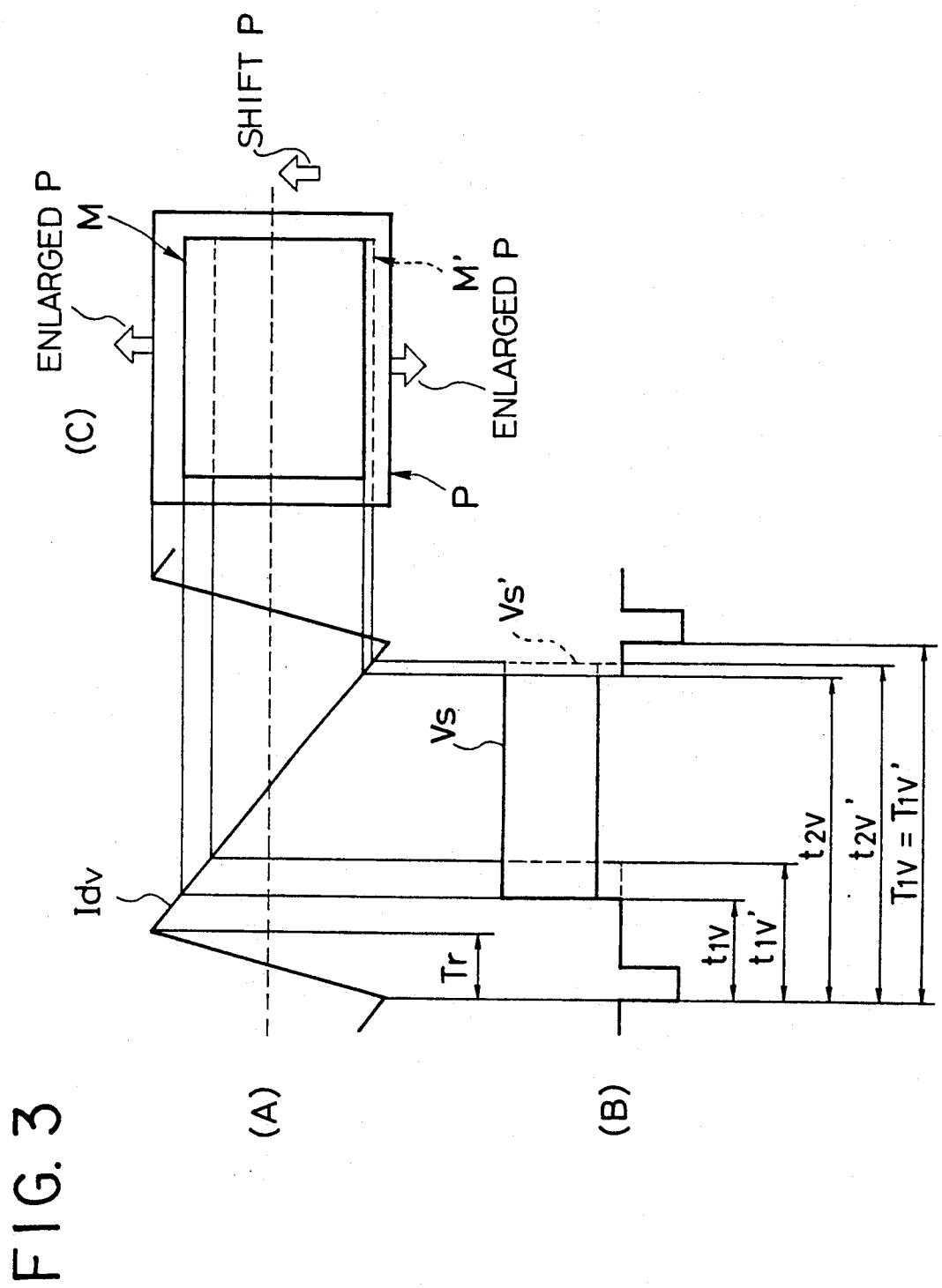
FIG. 3 is a diagram explaining the changing state of a display screen when a video signal with a different timing specification is input in the CRT display unit according to the present invention.

As shown in FIG. 3, it is assumed, for example, that although the display cycle $T_1v'$ of the input video signal $V_S$ is equal to the display cycle $T_1v$ of the reference picture display area M, the video signal $V_S$ shown by a dotted line and having a timing different from the reference timing specification of the display cycle $T_1v$ is input. When no correction is executed in this case, since the display start position $t_1v'$ and display end position $t_2v'$ have a timing specification different from the reference timing specification of the reference picture display area M, the display size $L_v'$ of the picture display area created by the input video signal $V_S$ is $(t_2v'-t_1v')/(t_2v-t_1v)$ times the display size $L_v$ of the reference picture display area M, as shown by the dotted line in FIG. 3 (C) and the display position thereof is dislocated downwardly.

In this case, the amounts of dislocation of the display start position and display end position are represented by $(t_1v'-t_1v)=\delta_{1v}$ and $(t_2v'-t_2v)=\delta_{2v}$, respectively (step 26) an average value of the dislocation $(\delta_{1v}+\delta_{2v})$ is determined and the display positions are corrected by multiplying the level of a vertical deflection voltage $Id_{0v}$ (center of amplitude) corresponding to the reference timing specification by $(\delta_{1v}+\delta_{2v})/2$ (step 27). With this arrangement, the vertical deflection current $Id_{0v}$ corresponding to the reference timing specification is shifted upward as the vertical deflection current $Id_{1v}$ shown by the dotted in FIG. 7 and thus the picture display area M' is shifted from the position in FIG. 7(a) to the position in FIG. 7(b). Further, a correction is executed in such a manner that a ratio of the display period of the input video signal to the display period of the reference timing specification $(t_2v-t_1v)/(t_2v'-t_1v')$ is determined and the current amplitude of the vertical deflection current $Id_{1v}$ is increased to $(t_2v-t_1v)/(t_2v'-t_1v')$ times thereof (step 28). With this arrangement, the vertical deflection current is corrected to the vertical deflection current $Id_{2v}$ shown in FIG. 7 and thus the picture display area M' can be drawn by the same display size $L_v$ and display position as those of the reference timing specification, as shown in FIG. 7(C).

Figure 7:
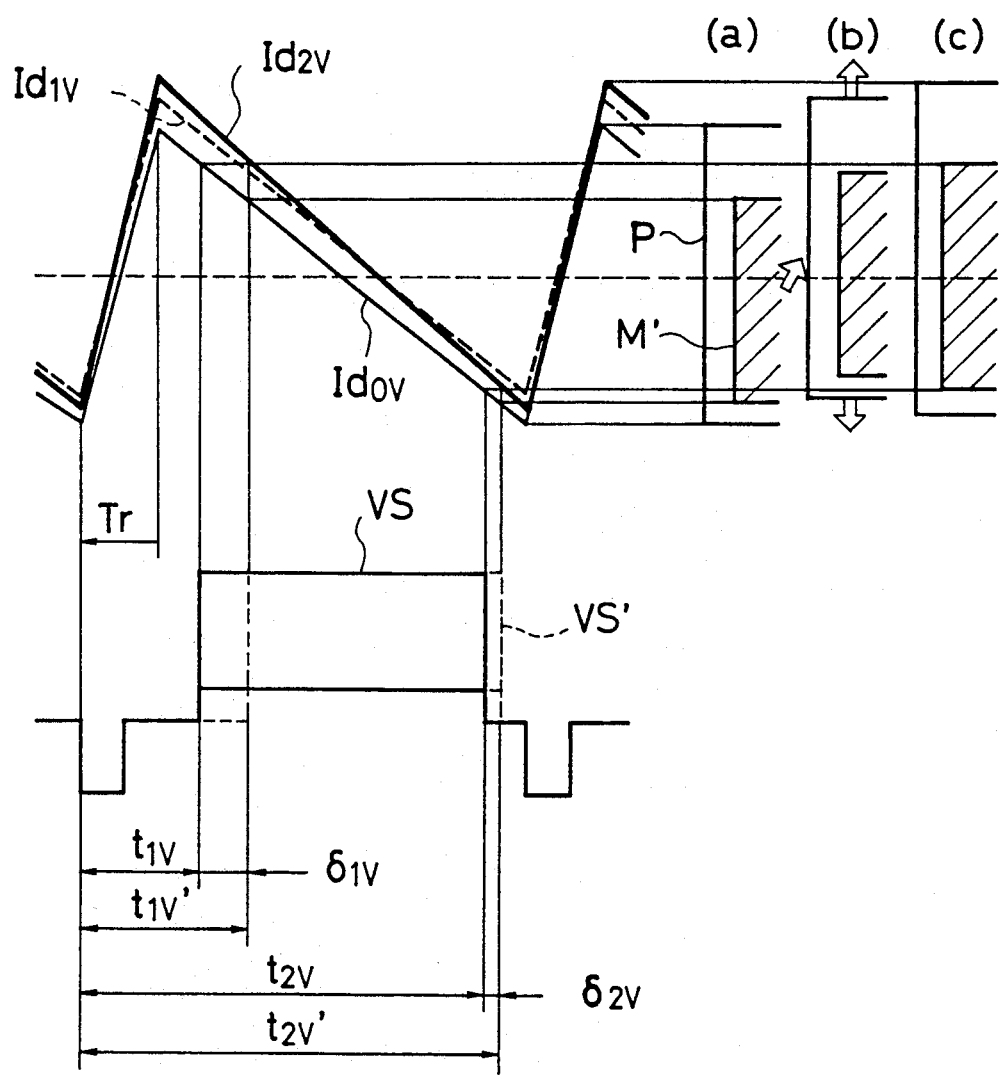
FIG. 7 is a diagram explaining an example of the changing states of a video signal, vertical deflection current, and display screen for explaining the correction of the vertical size and position of a picture display area when a video signal with a timing specification different from a reference timing specification is input.
Figure 8:
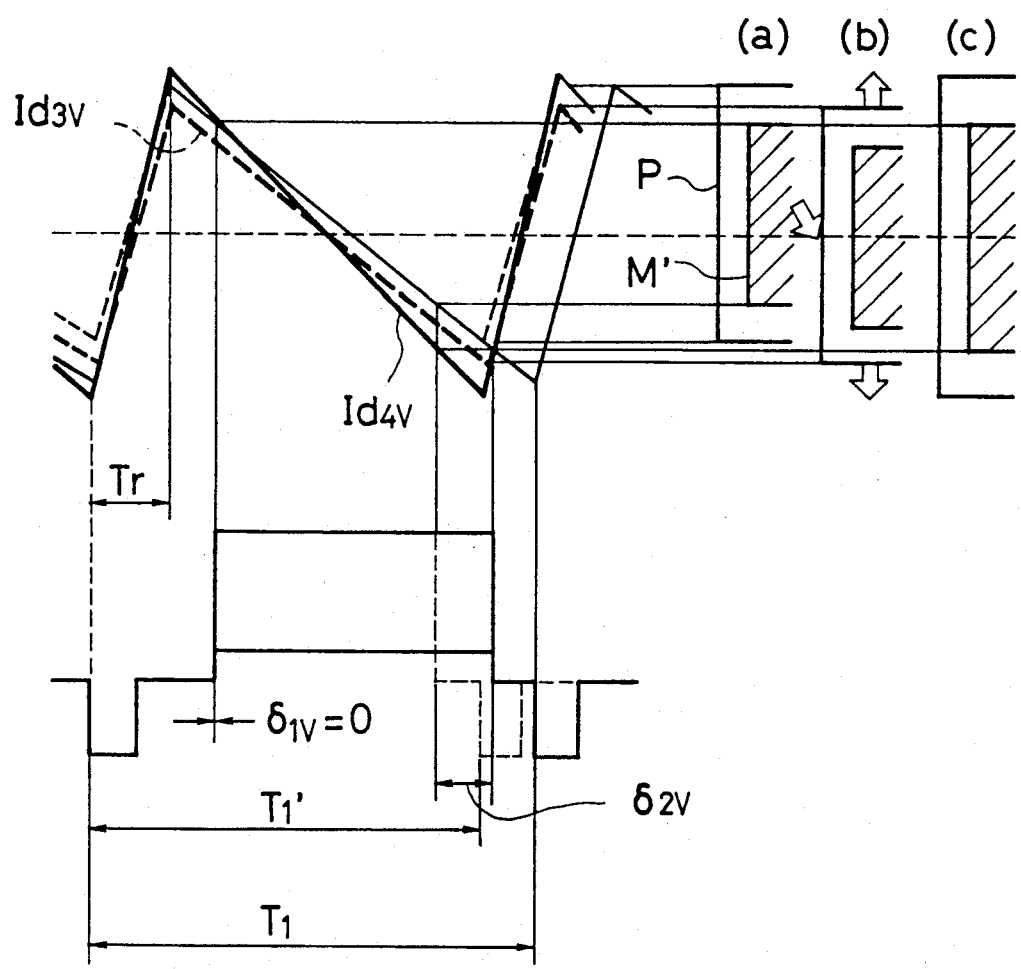
FIG. 8 is a diagram explaining another example of the changing states of a video signal, vertical deflection current, and display screen for explaining the correction of the vertical size and position of a picture display area when a video signal with a timing specification different from a reference timing specification is input.

Although the example described with reference to FIG. 7 is a case in which the cycle $T_1v'$ of the vertical synchronizing signal is equal to the cycle $T_1v$ of the reference timing specification, even if a video signal having $T_1v'$ different from $T_1v$ is input, the picture display area M' can be drawn by the same display size $L_V$ and display position as those of the reference timing specification by the execution of the same processing. More specifically, as shown by the dotted line of FIG. 8, a deflection current $Id_{4V}$, which can draw the picture display area M' having the same display size and display position as those of the reference timing specification on the tube surface of the CRT 9, can be obtained in such a manner that, first, the level of a deflection current $Id_{3V}$ is shifted downward by $(\delta_{1V}+\delta_{2V})/2$ and then the current amplitude thereof is increased to $(t_{2V}-t_{1V})/(t_{2V}'-t_{1V}')$ times the original current amplitude thereof.

The correction data $(\delta_{1V}+\delta_{2V})/2$ and $(t_{2V}-t_{1V})/(t_{2V}'-t_{1V}')$ output from the CPU 5 are input to the picture adjustment circuit 8A. As shown in FIG. 4, the correction data $(\delta_{1V}+\delta_{2V})/2$ input to the picture adjustment circuit 8A is converted to a correction amount of an analog value by the D/A converter 15A, added to the amount of initial adjustment preset by the display position adjustment trimmer VR2 and supplied to a deflection circuit 7A through the amplifier 17B. The amount of initial adjustment set by the trimmer VR2 corresponds to the amount of initial adjustment of the central position of the picture display area and is equivalent to the level command of a sawtooth vertical deflection current $Id_V$. On the other hand, the correction data $(t_{2V}-t_{1V})/(t_{2V}'-t_{1V}')$ is corrected to a correction amount of an analog value by the D/A converter 15B, added to the amount of initial adjustment preset by the display size adjustment trimmer VR1 and supplied to the deflection circuit 7A through the amplifier 17A. The amount of initial adjustment set by the trimmer VR1 corresponds to the amount of initial adjustment of the vertical size $L_V$ of the picture display area and is equivalent to the amplitude command of the sawtooth vertical deflection current $Id_V$.

As shown in FIG. 4, the deflection circuit 7A comprises a deflection current generation power supply 21 and a transistor $Q_1$ for adjusting the level of a deflection current. The deflection current generation power source 21 flows the sawtooth vertical deflection current $Id_{VV}$ to the circuit composed of a vertical deflection coil 20, capacitor C1 and resistor R12 in synchronism with the vertical synchronizing signal $V_{SYNC}$. The vertical synchronizing signal $Id_V$ has an amplitude value adjusted in accordance with an output (amplitude command) from the amplifier 17A which is input from the picture adjustment circuit 8A through a resistor R9. Further, the central level of amplitude of the vertical deflection current $Id_V$ flowing to the vertical deflection coil 20 is adjusted by adjusting a current bypassed through the transistor $Q_1$ in accordance with an output (level command) from the amplifier 17B which is input from the picture adjustment circuit 8A through a transistor R10.

Figure 9:
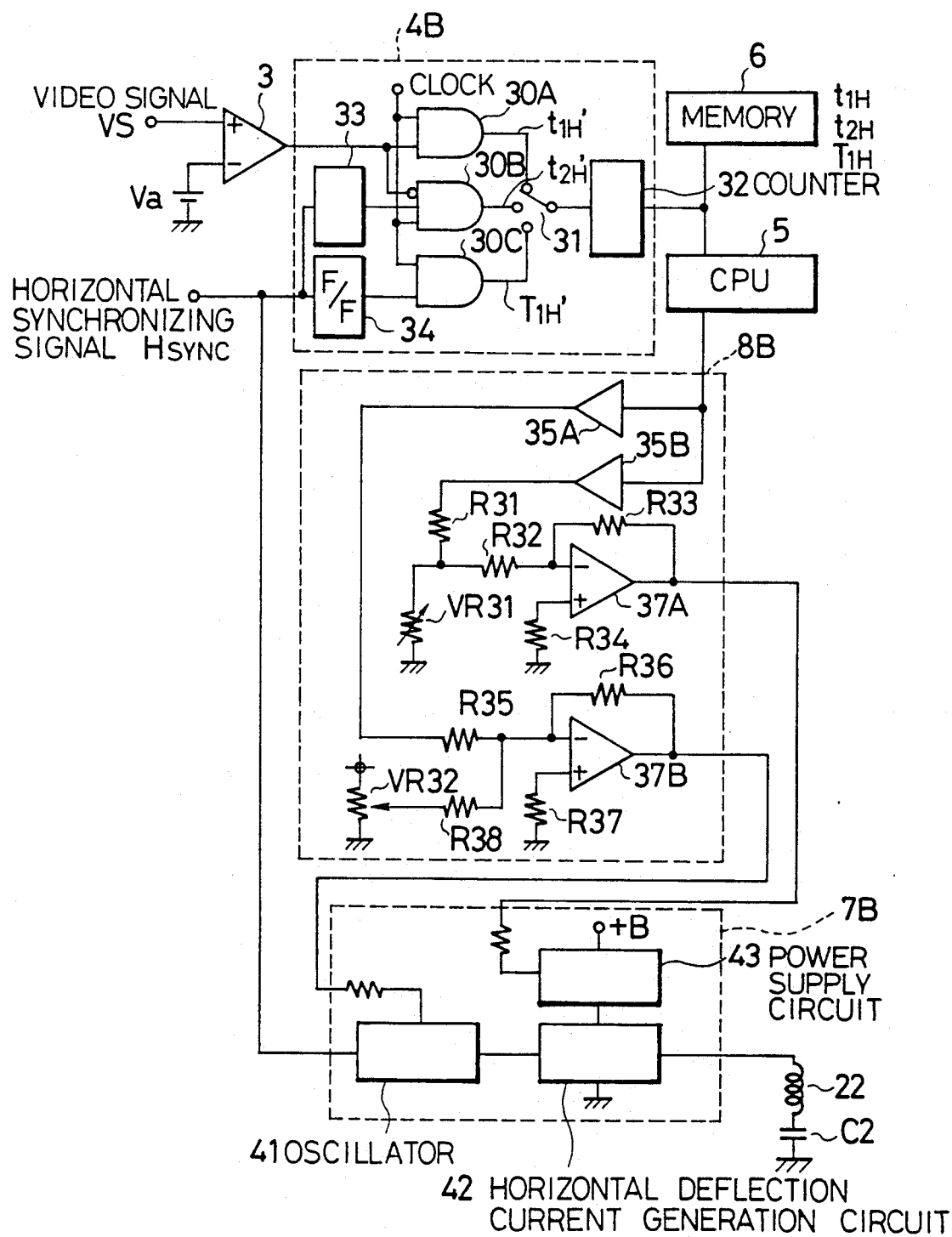
FIG. 9 is a circuit diagram showing the specific arrangement of a main portion relating to the adjustment of the horizontal size and position of the picture display area of the CRT display unit shown in FIG. 1.

FIG. 9 shows the arrangement of a main portion for adjusting the horizontal size $L_H$ and display position of the picture display area M. As shown in FIG. 9, a timing information detection circuit 4B has the same basic arrangement as that of the embodiment for adjusting the vertical size $L_V$ and display position shown in FIG. 4 except that the mask circuit 16 is not provided and is composed of AND gates 30A–30C, multiplexer 31, counter 32, and monostable multivibrator 33 and bistable multivibrator 34 triggered by the horizontal synchronizing signal $H_{SYNC}$.

Further, a picture adjustment circuit 8B is composed of D/A converters 35A, 35B, operational amplifiers 37A, 37B, display size adjustment trimmer VR31 for adjusting the horizontal display size $L_H$ of the picture display area, display position adjustment trimmer VR32 for adjusting the horizontal display position of the picture display area, and resistors R31–R38.

A deflection circuit 7B is a well known circuit for adjusting a horizontal deflection current flowing to a horizontal deflection coil 22 and comprises an oscillator 41 for generating a pulse signal in synchronism with the horizontal synchronizing signal $H_{SYNC}$, power supply circuit 42 and horizontal deflection current generation circuit 43 to supply a horizontal deflection current $Id_H$ to the circuit composed of the horizontal deflection coil 22 and a capacitor C2.

Figure 10:
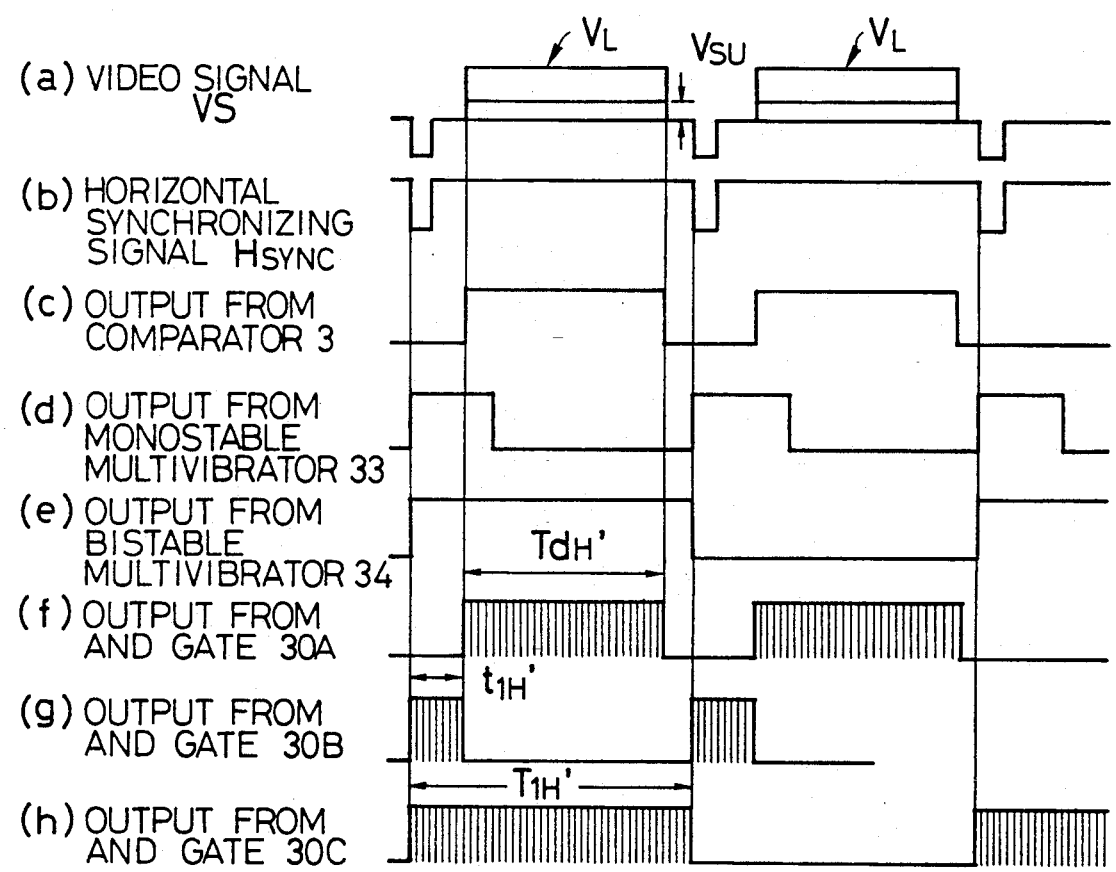
FIG. 10 is a timing chart showing the operating state of the main portion of the CRT display unit shown in FIG. 9.

As shown in the timing chart of FIG. 10, in the above arrangement, the timing information detection circuit 4B operates in the same way as the aforementioned timing information detection circuit 4A. That is, the comparator 3 outputs a signal which goes to a high level in synchronism with the display period $Td_H$ of the video signal $V_L$ for a single horizontal scanning line [FIGS. 10(a), 10(c)]. The monostable multivibrator 33 is triggered by the input horizontal synchronizing signal $H_{SYNC}$ [FIG. 10 (b)] and outputs pulses with a given width to the AND gate 30B as a gate signal [FIG. 10(d)]. This pulse width is set to cover the maximum variable value of a timing specification from the time at which the horizontal synchronizing signal $H_{SYNC}$ is input to the display start position $t_{1H}'$ where the video signal $V_L$ for a first line is input. The bistable multivibrator 34 is operated in response to the horizontal synchronizing signal $H_{SYNC}$ [FIG. 10(b)] and outputs a signal which is repeatedly inverted in synchronism with the horizontal synchronizing signal $H_{SYNC}$ to the AND gate 30C as a gate signal [FIG. 10(e)].

The AND gates 30A–30C are input with clock pulses and the AND gate 30A outputs clock pulses fetched within the display period $Td_H$ to the counter 32 through the multiplexer 31 [FIG. 10(f)]. The clock pulses used here preferably have a frequency higher than that of the clock pulses used for the vertical adjustment in FIG. 4 (e.g., 100 MHz). When clock pulses of 100 MHz are used, for example, timing information can be read with an accuracy of 0.01 second, which means that the size and position of the picture display area can be adjusted with an accuracy of about 0.3 mm in a CRT display of 20 inches. The AND gate 30B supplies clock pulses before the display period $Td_H$ is started to the counter 32 through the multiplexer 31 [FIG. 10(g)]. The AND gate 30C supplies clock pulses fetched within the cycle of the horizontal synchronizing signal $H_{SYNC}$ to the counter 32 through the multiplexer 31 every one cycle [FIG. 10(h)]. The counter 32 counts the number of input clock pulses and outputs the display period $dT_H$ [$=(t_{2H}'-t_{1H}')$], display start position $t_{1H}'$, and display cycle $T_{1H}'$.

Respective data detected by the timing information detection circuit 4B are compared by the CPU 5 with the display start position $t_{1H}$, display end position $t_{2H}$ and cycle $T_{1H}$ of the reference timing specification used at the initial picture adjustment and prestored in the memory 6. The processing executed by the CPU 5 is the same as that described above with reference to FIG. 6 except that correction data $(\delta_{1H}+\delta_{2H})/2$ and $(t_{2H} - t_{1H})/(t_{2H'} - t_{1H'})$ obtained as a result of the processing are output to the picture adjustment circuit 8B.

The correction data output from the CPU 5 is input to the picture adjustment circuit 8B. As shown in FIG. 9, the correction data $(\delta_{1H} + \delta_{2H})/2$ is converted to a correction amount of an analog value by the D/A converter 35A, added to the initial amount of correction preset by the display position adjustment trimmer VR32 and supplied to the deflection circuit 7B through the amplifier 37B. The initial amount of correction set by the trimmer VR32 is equivalent to the time axis correction command of the sawtooth horizontal deflection current $Id_H$ to the horizontal synchronizing signal $H_{SYNC}$. On the other hand the correction data $(t_{2H} - t_{1H})/(t_{2H'} - t_{1H'})$ is converted to a correction amount of an analog value by the D/A converter 35B, added to the initial amount of correction preset by the display size adjustment trimmer VR31 and supplied to the deflection circuit 7B through the amplifier 37A. The initial amount of adjustment set by the trimmer VR31 corresponds to the initial amount of adjustment of the horizontal size $L_H$ of the picture display area and is equivalent to the amplitude command of the sawtooth horizontal deflection current $Id_H$.

The amplitude command of the horizontal deflection current $Id_H$ output from the amplifier 37A is input to the power supply circuit 43 through a resistor R39 to adjust the amplitude of the horizontal deflection current $Id_H$ flowing to the horizontal deflection coil 22. The time axis correction command of the horizontal deflection current $Id_H$ output from the amplifier 37B is input to the oscillator 41 through a resistor R40 and thus the phase of the pulses output from the oscillator 41 is advance or delayed in accordance with the time axis correction command. With this arrangement, the time axis (phase) of the horizontal deflection current $Id_H$ shown in FIG. 11 is shifted to the right or left in the figure.

The adjustment of the horizontal size $L_H$ and position of the image display area M' will be described with reference to FIG. 11. FIG. 11(A) shows a horizontal deflection current, FIG. 11(B) shows the display state of a picture display area, and FIG. 11(C) shows the timing specification of a video signal. In FIG. 11, it is assumed that the initial adjustment of the picture adjustment circuit 8B and deflection circuit 7B is executed based on the reference timing specification shown by the solid line in FIG. 11. On the other hand, when the video signal $V_S$ having a timing specification shown by a dotted line is input, the picture display area M' is shifted to the right with respect to the reference picture display area M and displayed in a smaller size as shown by a display size $L_{H'}$. More specifically, the picture display area M' has a display start position shifted to the right by $\delta_{1H} = t_{1H'} - t_{1H}$ with respect to the reference picture display area M and a display end position shifted to the right by $\delta_{2H} = t_{2H'} - t_{2H}$.

In this case, to cause the horizontal central of the picture display area M' to coincide with the center of the reference picture display area M, it suffices to advance the time axis (phase) of the video signal $V_S$ by $(\delta_{1H} + \delta_{2H})/2$ with respect to the horizontal synchronizing signal $H_{SYNC}$ in the same way as the adjustment of the vertical position. For this purpose, in this embodiment, the phase of the horizontal deflection current $Id_{dH}$ is advanced with respect to the phase of the horizontal synchronizing signal $H_{SYNC}$ by the oscillator 41 in accordance with the time axis correction command. The picture display area is corrected to the position M'' shown by the dot-dash-line of the FIG. 11 (B) by this correction. Note, FIG. 11(A) shows a result in which the phase of the horizontal deflection current $Id_H$ is advance by correction.

On the other hand, to cause the horizontal size $L_{H'}$ of the picture display area M' to coincide with the reference size $L_H$, the horizontal deflection current $Id_H$ is corrected to $Id_{1H}$ shown by the dotted line of FIG. 11 which is obtained by multiplying $Id_{0H}$ of the reference timing specification by $(t_{2H} - t_{1H})/(t_{2H'} - t_{1H'})$ times. With this arrangement, the picture display area coincides with the reference picture display area M in the figure.

As described above, according to the present invention, even if a video signal with a different timing specification is input, a picture display area can be automatically adjusted to a reference size and position without the need of previously inputting data such as a display period ratio, display phase and the like. As a result, a convenient general purpose CRT display unit can be realized.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A CRT display unit, comprising:
   a cathode ray tube including an electron gun for irradiating an electron beam to a tube surface in accordance with an input video signal;
   a horizontal deflection coil and vertical deflection coil provided with said cathode ray tube;
   a horizontal deflection circuit for horizontally scanning said electron beam by flowing a sawtooth reflection current to said horizontal deflection coil in synchronism with the horizontal synchronizing signal contained in said video signal;
   a vertical deflection circuit for vertically scanning said electron beam by flowing a sawtooth deflection-current to said vertical deflection cell in synchronism with the vertical synchronizing signal contained in said video signal;
   a comparator for detecting the rising-up and falling-down of a set-up voltage superimposed upon said video signal;
   arithmetic operation means for detecting the display period of a picture corresponding to a horizontal scanning line based upon a signal output from said comparator as well as detecting the relative positional relationship on a time axis between said detected display period and said horizontal synchronizing signal; and
   picture adjustment means for correcting the amplitude of said horizontal deflection current so that said display detected by said arithmetic operation means period coincides with a predetermined reference display period and correcting the level and one of the phases of said horizontal deflection current so that the relative positional relationship on a time axis detected by said arithmetic means between said detected display period and said horizontal synchronizing signal coincides with a predetermined reference relative positional relationship.

2. A CRT display unit according to claim 1, wherein:

said arithmetic operation means further comprises timing information detection means for measuring the rising-up timing $t_{1H}'$ and falling-down timing $t_{2H}'$ of said set-up voltage based on a signal output from said comparator and said horizontal synchronizing signal by using said horizontal synchronizing signal as a reference point and detecting the difference between said rising-up timing $t_{1H}'$ and said falling-down timing $t_{2H}'$ measured by said timing information detection means as said display period $(t_{2H}'-t_{1H}')$ to determine the ratio of said display period to the predetermined reference value of said display period $(t_{2H}'-t_{1H}')$ as $(t_{2H}'-t_{1H}')/(t_{2H}-t_{1H})$ as well as determine the average value $(\delta_{1H}+\delta_{2H})/2$ of the difference $\delta_{1H}'$ between said rising-up timing t1H' and said predetermined reference value $t_{1H}$ thereof and the difference $\delta_{2H}'$ between said falling-down timing $t_{2H}'$ and said predetermined reference value $t_{2H}$ thereof as the amount of dislocation between said relative positional relationship on a time axis of said display period to said horizontal synchronizing signal and said reference relative positional relationship; and said picture adjustment means corrects the amplitude of said horizontal deflection current in accordance with said ratio $(t_{2H}'-t_{1H}')/(t_{2H}-t_{1H})$ determined by said arithmetic operation means as well as corrects the level and one of the phases of said horizontal deflection current in accordance with said average value $(\delta_{1H}+\delta_{2H})/2$.

3. A CRT display unit, comprising:
a cathode ray tube including an electron gun for irradiating an electron beam to a tube surface in accordance with an input video signal;
a horizontal deflection coil and vertical deflection coil provided with said cathode ray tube;
a horizontal deflection circuit for horizontally scanning said electron beam by flowing a sawtooth deflection current to said horizontal deflection coil in synchronism with the horizontal synchronizing signal contained in said video signal;
a vertical deflection circuit for vertically scanning said electron beam by flowing a sawtooth deflection current to said vertical deflection cell in synchronism with the vertical synchronizing signal contained in said video signal;
a comparator for detecting the rising-up and falling-down of a set-up voltage superimposed upon said video signal;
arithmetic operation means for detecting the display period of a picture corresponding to a single scan based on a signal output from said comparator as well as detecting the relative positional relationship on a time axis between said detected display period and said vertical synchronizing signal; and
picture adjustment means for correcting the amplitude of said vertical deflection current so that said display period detected by said arithmetic operation means coincides with a predetermined reference display period and correcting the level of said vertical deflection current so that the relative positional relationship on a time axis, detected by said arithmetic operation means, between said detected display period and said vertical synchronizing signal coincides with a predetermined reference relative positional relationship.

4. A CRT display according to claim 3, wherein:

said arithmetic operation means further comprises timing information detection means for measuring the rising-up timing $t_{1V}'$ and falling-down timing $t_{2H}'$ of said set-up voltage for a single picture based on a signal output from said comparator and said vertical synchronizing signal by using said horizontal synchronizing signal as a reference point and detecting the difference between said rising-up timing $t_{1V}'$ and said falling-down timing $t_{2V}'$ measured by said timing information detection means as said display period $(t_{2V}'-t_{1V}')$ to determine the ratio of said display period to the predetermined reference value of said display period $(t_{2V}'-t_{1V}')$ as $(t_{2V}'-t_{1V}')/(t_{2V}-t_{1V})$ as well as determine the average value $(\delta_{1V}+\delta_{2V})/2$ of the difference $\delta_{1V}'$ between said rising-up timing t1V' and said predetermined reference value $t_{1V}$ thereof and the difference $\delta_{2V}'$ between said falling-down timing $t_{2V}'$ and said predetermined reference value $t_{2V}$ thereof as the amount of dislocation between said relative positional relationship on a time axis of said display period to said vertical synchronizing signal and said reference relative positional relationship; and said picture adjustment means corrects the amplitude of said vertical deflection current in accordance with said ratio $(t_{2V}'-t_{1V}')/(t_{2V}-t_{1V})$ determined by said arithmetic operation means as well as corrects the level of said vertical deflection current in accordance with said average value $(\delta_{1V}+\delta_{2V})/2$.

5. A CRT display unit, comprising:
a cathode ray tube including an electron gun for irradiating an electron beam to a tube surface in accordance with an input video signal;
a horizontal deflection coil and vertical deflection coil provided with said cathode ray tube;
a horizontal deflection circuit for horizontally scanning said electron beam by flowing a sawtooth deflection current to said horizontal deflection coil in synchronism with the horizontal synchronizing signal contained in said video signal;
a vertical deflection circuit for vertically scanning said electron beam by flowing a sawtooth deflection current to said vertical deflection cell in synchronism with the vertical synchronizing signal contained in said video signal;
a comparator for detecting the rising-up and falling-down of a set-up voltage superimposed upon said video signal;
arithmetic operation means for detecting the first display period of a picture corresponding to a horizontal scanning line and the second display period of the picture corresponding to a single screen based upon a signal output from said comparator as well as detecting the relative positional relationship on a time axis between said detected first display period and said horizontal synchronizing signal and the relative positional relationship on a time axis between said detected second display period and said vertical synchronizing signal; and
picture adjustment means for correcting the amplitudes of said vertical deflection current and said vertical deflection current corresponding to each other so that said first and second display period detected by said arithmetic operation means coincides with a predetermined reference display period and correcting the level and one of the phases of said horizontal deflection current so that the relative positional relationship on a time axis detected by said arithmetic operation means, between said detected first display period and said horizontal synchronizing signal coincides with a predetermined reference relative positional relationship and correcting the level of said vertical deflection current so that the relative positional relationship on a time axis between said detected second display period and said vertical synchronizing signal coincides with a predetermined reference relative positional relationship.

6. A CRT display unit according to claim 5, wherein:

said arithmetic operation means further comprises timing information detection means for measuring the rising-up timing $t_{1H}'$ and falling-down timing $t_{2H}'$ of said set-up voltage corresponding to said horizontal scanning line by using said horizontal synchronizing signal as a reference point and the rising-up timing $t_{1V}'$ and falling-down timing $t_{2V}'$ of said set-up voltage for a single picture by using said vertical synchronizing signal as a reference point, based upon a signal output from said comparator, said vertical synchronizing signal and said horizontal synchronizing signal;

said arithmetic operation means comprises:

first arithmetic means for detecting the difference between said rising-up timing $t_{1H}'$ and said falling down timing $t_{2H}'$ measured by said timing information detection means as said first display period $(t_{2H}'-t_{1H}')$ to determine the ratio of said display period to the predetermined reference value of said first display period $(t_{2H}-t_{1H})$ as $(t_{2H}'-t_{1H}')/(t_{2H}-t_{1H})$ as well as determine the average value $(\delta_{1H}+\delta_{2H})/2$ of the difference $\delta_{1H}$ between said rising-up timing $t_{1H}'$ and said predetermined reference value $t_{1H}$ thereof and the difference $\delta_{2H}$ between said falling-down timing $t_{2H}'$ and said predetermined reference value $t_{2H}$ thereof as the amount of dislocation between said relative positional relationship on a time axis of said first display period to said horizontal synchronizing signal and said reference relative positional relationship; and second arithmetic means for detecting the difference between said rising-up timing $t_{1V}'$ and said falling down timing $t_{2V}'$ measured by said timing information detection means as said second display period $(t_{2V}'-t_{1V}')$ to determine the ratio of said display period to the predetermined reference value of said second display period $(t_{2V}-t_{1V})$ as $(t_{2V}'-t_{1V}')/(t_{2V}-t_{1V})$ as well as determine the average value $(\delta_{1V}+\delta_{2V})/2$ of the difference $\delta_{1V}$ between said rising-up timing $t_{1V}'$ and said predetermined reference value $t_{1V}$ thereof and the difference $\delta_{2V}$ between said falling-down timing $t_{2V}'$ and said predetermined reference value $t_{2V}$ thereof as the amount of dislocation between said relative positional relationship on a time axis of said second display period to said vertical synchronizing signal and said reference relative positional relationship; and wherein further said picture adjustment means corrects the amplitude of said horizontal deflection current in accordance with said ratio $(t_{2H}'-t_{1H}')/(t_{2H}-t_{1H})$ determined by said first arithmetic operation means as well as corrects the level and one of the phases of said horizontal deflection current in accordance with said average value $(\delta_{1H}+\delta_{2H})/2$, and corrects the amplitude of said vertical deflection current in accordance with said ratio $(t_{2V}'-t_{1V}')/(t_{2V}-t_{1V})$ determined by said second arithmetic operation means as well as corrects the level of said vertical deflection current in accordance with said average value $)\delta_{1V}+\delta_{2V})/2$.

* * * * *